June 15, 1954   B. J. DAIGLE   2,680,908
DENTAL ISOLATOR AND CONE
Filed Dec. 30, 1952   3 Sheets-Sheet 1
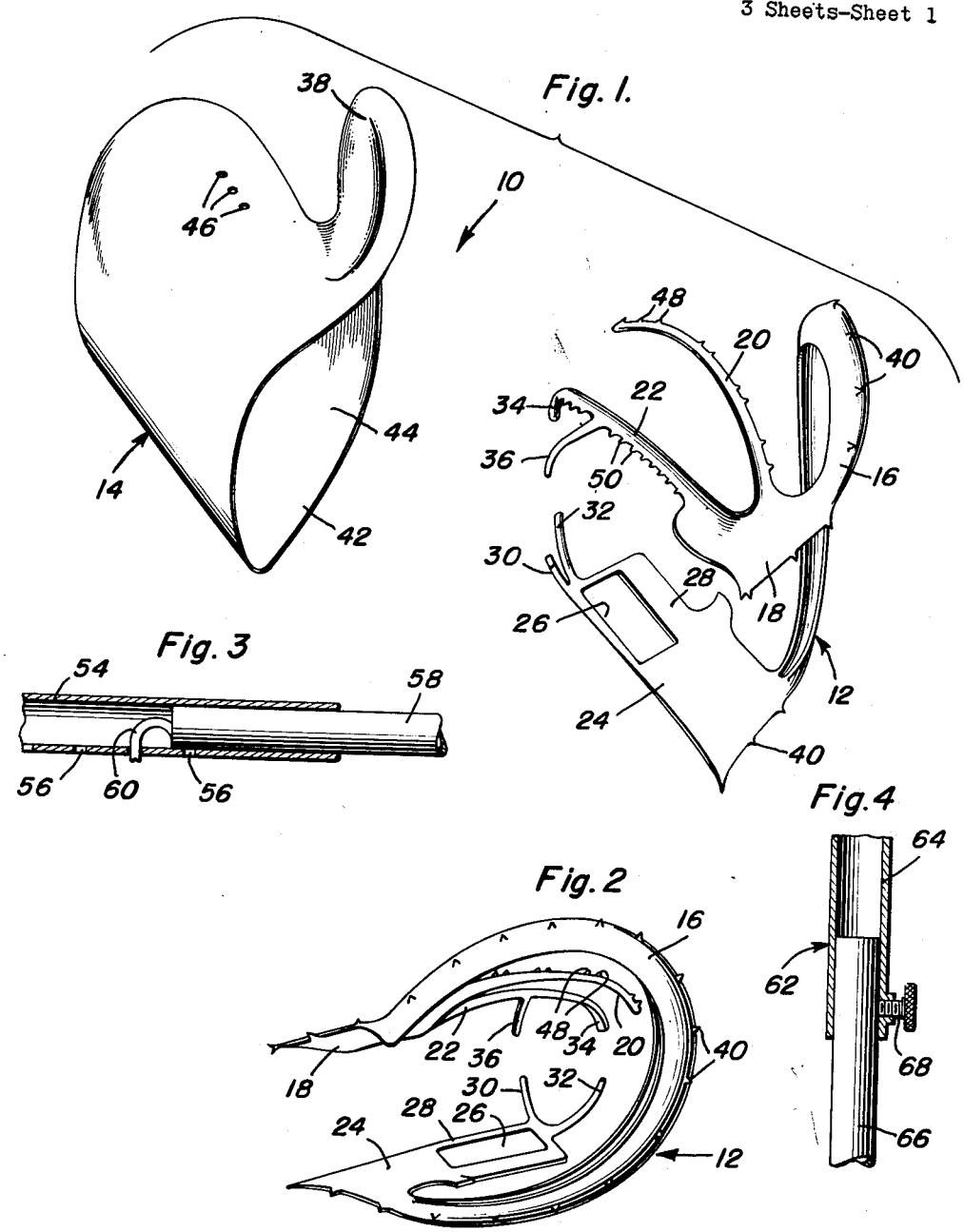
Bert J. Daigle
INVENTOR.

June 15, 1954   B. J. DAIGLE   2,680,908
DENTAL ISOLATOR AND CONE
Filed Dec. 30, 1952   3 Sheets-Sheet 2
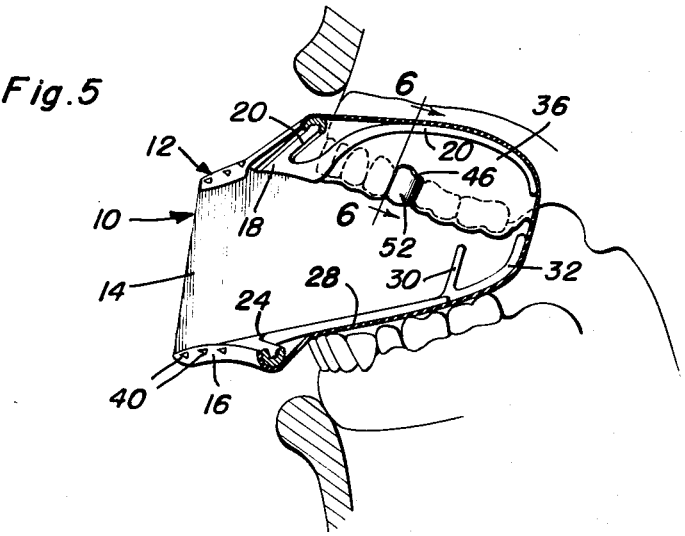
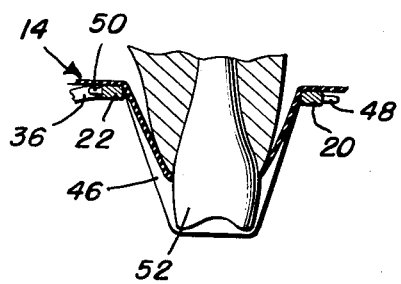
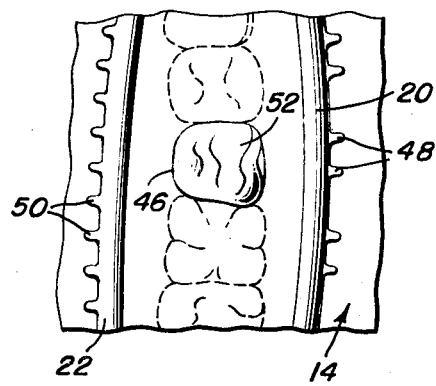
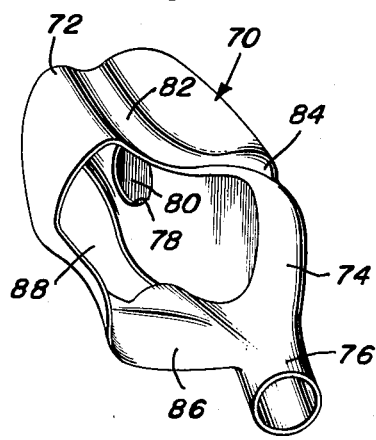
Bert J. Daigle
INVENTOR.

June 15, 1954  B. J. DAIGLE  2,680,908
DENTAL ISOLATOR AND CONE
Filed Dec. 30, 1952  3 Sheets-Sheet 3
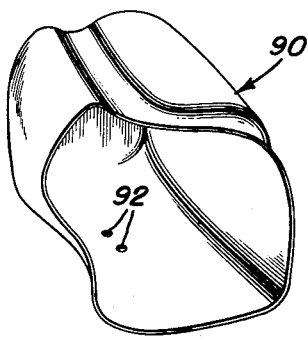
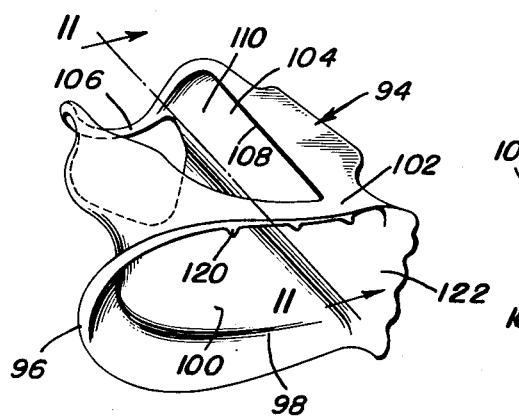
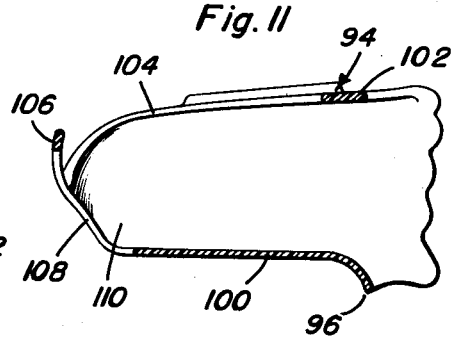
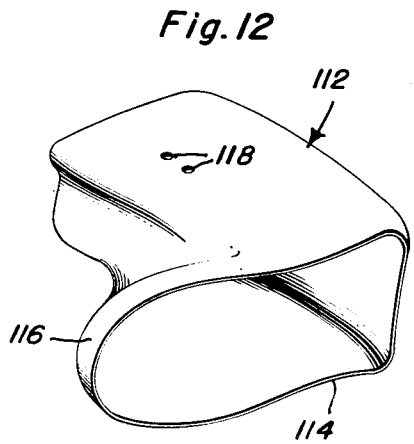
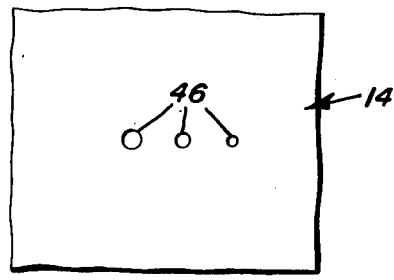
Bert J. Daigle
INVENTOR.
BY *[signatures]*
Attorneys Patented June 15, 1954

2,680,908

UNITED STATES PATENT OFFICE 2,680,908

DENTAL ISOLATOR AND CONE

Bert J. Daigle, Sulphur, La., assignor of one sixty-fourth to Ellis Woody Thompson, Calcasieu Parish, La.

Application December 30, 1952, Serial No. 328,553

19 Claims. (Cl. 32—35)

The present invention relates to new and useful improvements in dental isolators for one or more teeth while subjecting the same to operative dentistry.

The primary object of this invention is to provide an improved dental appliance which may be inserted in a patient's mouth to facilitate the isolation of one or more teeth while subjecting the tooth or teeth to an air abrasive treatment, said appliance including means for completely surrounding the tooth or teeth subject to the air abrasive treatment and protecting the remaining teeth and portions of the patient's mouth.

Another object of this invention is to provide an improved dental isolation frame which permits complete accessibility for all instruments and techniques used in operative dentistry.

Another object of this invention is to provide an improved dental appliance for insertion in a patient's mouth to facilitate the isolation of one or more teeth and at the same time providing means for collecting and the removal of used abrasive powder from the oral cavity when using the air abrasive technique.

Another object of this invention is to provide an improved cone or dental dam for use with an isolator frame to form a dental isolator for isolating one or more teeth during operative dentistry.

Another object of this invention is to provide an improved dental appliance which is of relatively simple construction and which is efficient and reliable in operation so as to be both economically feasible and practical.

A further object of this invention is to provide an improved dental appliance which includes an isolator frame used in combination with a perforated rubber dam to form a dental isolator for the isolation of one or more teeth when a patient bites upon the dental appliance in the proper manner.

A still further object of this invention is to provide an improved dental appliance which creates an isolated field in dental air abrasive techniques and so as to prevent aspiration of abrasive particles, said dental appliance also serving to protect the interior of the mouth of a patient from harmful or painful effects of the abrasive and at the same time, providing a support for the mandible and maxilla when in place in a patient's mouth and providing a dry field of operation in all techniques used in operative dentistry.

These together with other objects and advantages which will become subsequently appear- ent reside in the details of construction and operation as more fully hereinafter described and claimed, reference being had to the accompanying drawings forming a part hereof, wherein like numerals refer to like parts throughout, and in which:

Figure 1 is an exploded perspective view of a preferred form of the invention and shows the general appearance of both a dental isolator frame and its associated dam;

Figure 2 is front elevational view of the isolator frame of Figure 1 and shows the general construction of the same;

Figure 3 is an enlarged fragmentary sectional view of a modified form of a lingual, buccal or labial bar and shows the manner in which the same may be selectively extended;

Figure 4 is an enlarged fragmentary sectional view of a central portion of a main supporting portion of the isolator frame and shows the manner in which the relative height of the isolator frame may be varied;

Figure 5 is a longitudinal vertical sectional view of the dental isolator of Figure 1 and shows the same disposed within a patient's mouth with a single tooth of the patient projecting through an aperture in the cone and being isolated from the remaining teeth;

Figure 6 is an enlarged fragmentary sectional view taken substantially upon the plane indicated by the section line 6—6 of Figure 5 and shows the relationship of the isolated tooth, the gum surrounding the tooth, and associated portions of the dental isolator;

Figure 7 is an enlarged fragmentary bottom plan view of that portion of the dental isolator surrounding the isolated tooth;

Figure 8 is a front perspective view of a modified form of isolator frame;

Figure 9 is a front perspective view of a cone for the isolator frame of Figure 8;

Figure 10 is a front perspective view of a still another modified form of isolator frame;

Figure 11 is a longitudinal vertical sectional view taken substantially on the plane indicated by the section line 11—11 of Figure 10 and shows the general construction of the isolator frame;

Figure 12 is a front perspective view of a cone adapted for use in covering the isolator frame of Figure 10; and Figure 13 is an enlarged fragmentary plan view of a portion of one of the cones and shows the formation of apertures therein for the selective reception of teeth to be isolated.

Referring now to the drawings in detail, it will be seen that there is illustrated in Figures 1 through 7, inclusive, a preferred form of dental isolator which is referred to in general by the reference numeral 10. The dental isolator 10 includes an isolator frame, which is referred to in general by the reference numeral 12, and a cone, which is referred to in general by the reference numeral 14. It will be understood that the cone is configurated substantially identical to the isolator frame 12 in order that the same may be conveniently received over the isolator frame 12.

The isolator frame 12 includes a semi-circular anterior member 16 which is substantially semi-circular when viewed from the front. The semi-circular member 16 is offset from the remainder of the isolator frame 12 and forms the main support for the same. The upper free end of the member 16 terminates in an enlarged surface 18 whose rear portion is bifurcated and which terminates in a pair of rearwardly extending bars. One of the bars, the bar 20, is a buccal bar that fits on the buccal aspect of the gums when the isolator frame 12 is in place. In spaced relation to the buccal bar 20 is a lingual bar 22 that engages the lingual aspect of the gums when the isolator frame 12 is in place. It will be understood that the isolator frame 12 is designed specifically for operative dentistry on upper posterior teeth. When the frame is modified slightly for use with anterior teeth, the bar referred to as the buccal bar 20 will be known as a labial bar.

The lower free end of the anterior member 16 terminates in a rearwardly projecting sheet-like portion 24 having an opening 26 in the posterior part thereon. The sheet-like portion 24 has disposed adjacent the edge thereof remote from the anterior member 16 a surface 28 which is formed to correspond to the approximate curve of spee, the curvature being in both an anterioposterior direction and a lateral direction. On the instant isolator frame 12, this surface is convex. However, on other isolator frames of slightly different shapes for use in dental operations on teeth other than the upper posterior teeth, this surface may be concave.

The sheet-like portion 24 terminates at the rear remote corner thereof in a pair of diverging upwardly directed bars 30 and 32. The bar 32, which is the innermost of the two bars, functions as a tongue depressor together with the surface 28.

The lingual bar 22 terminates in a downwardly curved portion 34 which is generally in alignment with the bar 32. The lingual bar 22 also has extending therefrom at an angle thereto a downwardly directed portion 36 which is in alignment with the bar 30. It will be understood that the portions 34 and 36 of the lingual bar 22 are in spaced relation relative to the bars 32 and 30, respectively. The bars 30 and 32 and portions 34 and 36 also function as cone shapers.

The enlarged flat surface 18 and the sheet-like portion 24 of the dental isolator frame 12 are intended to be engaged by opposed teeth in biting relation for retaining the isolator frame in position. When the teeth are in biting relation with the isolator frame 12, they are retained in spaced relation to facilitate access to the oral cavity of a patient. At this time, the buccal bar 20 and the lingual bar 22 are disposed on opposite sides of the upper posterior teeth with the teeth projecting into the interior of the isolator frame 12. At the same time, the semicircular member 16 is in engagement with the lips and the cheek of a patient to facilitate lip and cheek retraction.

The isolator frame 12, if so desired, may be utilized in normal operative dentistry. However, when it is desired to isolate one or more teeth during normal operative dentistry or for the using of the air abrasive technique, it is necessary to utilize the cone 14 in combination with the isolator frame 12. While the cone 14 is generally conical in outline, it is not intended that the term "cone" be a limitation as to the shape of this element of the dental isolator 10. The cone 14 has the same general contour as the isolator frame 12 and includes an offset cheek portion 38 which is adapted to fit over the semi-circular member 16.

The anterior edge of the semi-circular member 16 is provided with a plurality of relatively small teats 40 which are adapted to engage an edge portion 42 of the cone 14 surrounding the opening 44 therein.

When the cone 14, which is formed of a rubber-like material of the same type utilized in dental dams, is disposed on the isolator frame 12, the same is in a relatively loosely fitting relation. The upper portion of the cone 14 is provided with a plurality of apertures 46 which are aligned with the space between the buccal bar 20 and the lingual bar 22 when the cone 14 is properly positioned on the isolator frame 12. It will be understood that these apertures may either be pre-formed or selectively formed by punch means (not shown) immediately prior to use of a cone, the latter method being preferred. In order that the area of the cone 14 surrounding the apertures 46 may be initially stretched, the buccal bar 20 and the lingual bar 22 are provided with oppositely disposed teats 48 and 50, respectively. The complete dental isolator 10 is then positioned in a patient's mouth and a selected one or more upper posterior teeth are passed through the apertures 46 which have been enlarged by the stretching of the cone to be of a size to receive teeth. The cone 14 is then disengaged from the teats 48 and 50 and allowed to return to its unstretched state with portions thereof immediately surrounding the apertures tightly engaging the teeth for purposes of isolating the same.

Referring now to Figures 5, 6 and 7 in particular, it will be seen that the dental isolator 10 is illustrated as being disposed in a patient's mouth. When properly disposed in a patient's mouth, the dental isolator 10 is retained therein by the biting action of opposed teeth upon the surface 18 and the sheet-like portion 24. At this time, an isolated tooth, only one tooth being shown in an isolated position, protrudes through an associated aperture 46 into the interior of the dental isolator 10. The tooth, which is referred to by the reference numeral 52, is then readily accessible for operative dentistry. It will be noted that all other portions of the patient's mouth including the remaining teeth are clearly protected by the cone 14.

The surface 18 and the sheet-like portion 24 are arcuate to facilitate rotation of the dental isolators 10 to positions permitting complete accessibility to the labial, buccal and lingual surfaces of exposed teeth. When the dental isolator 10 is rotated, teeth in biting engagement with the same remain in their same relative open positions.

Referring now to Figure 3 in particular, it will be seen that there is illustrated what may be considered a modified form of either the buccal bar 20 or the lingual bar 22. Inasmuch as the same may be illustrative of either of these two bars, the bar will be referred to by the reference numeral 54. The bar 54 is tubular and has disposed therein a plurality of apertures 56. Telescoped in a free end of the bar 54 is an extension 58 which has disposed at its inner end a resilient arcuate arm 60. The arm 60 forms a detent for positioning the extension 58 relative to the bar 54 and a portion thereof normally projects through one of the apertures 56 to position the extension 58. When it is desired to adjust the extension 58 relative to the bar 54, the arcuate arm 60 is depressed into the interior of the bar 54 and the extension 58 slid longitudinally thereof to an adjusted position. It will be understood that the bar 54 and its extension 58 will be provided with teats (not shown) for engagement with the cone 14.

Referring now to Figure 4 in particular, it will be seen that there is illustrated a central portion of a modified form of semi-circular anterior member of the isolator frame 12. It will be understood that the modified member, which is referred to in general by the reference numeral 62, is identical in outline with the semi-circular member 16 and that the portion thereof illustrated is the central portion thereof.

The semi-circular member 62 includes a first portion 64 which is tubular and a second portion 66 which is telescoped therein. The second portion 66 is adjusted relative to the tubular portion 66 by sliding one relative to the other, and locking the same in an adjusted position by a lock screw 68 carried by an end portion of the tubular member 64. By varying the amount the member 66 is telescoped within the tubular member 64, the effective height of the semi-circular member 62 may be varied. By varying the effective height of the semi-circular member 62, which forms the main support of its dental isolator, the surface 18 and the sheet-like portion 24 thereof may be of varied spacing so as to accommodate the isolator frame for use in various sized mouths.

While the buccal bar 20 and lingual bar 22 may be adjustable in length, and the semi-circular main supporting member adjustable in height, it will be understood that the isolator frame 12 will, of necessity, be made in different sizes for children, adults, etc. Furthermore, it will be understood that the various positions and exact shape of the various elements of the isolator frame will vary depending upon the particular teeth on which operative dentistry is to be performed. It will also be understood that the shape of the cone 14 will be varied accordingly.

Referring now to Figure 8 in particular, it will be seen that there is illustrated a modified form of isolator frame which is referred to in general by the reference numeral 70. The isolator frame 70 is in the form of a hollow body and is the subject matter of my copending application, Serial No. 288,863, filed May 20, 1952, now Patent No. 2,637,107 dated May 5, 1953.

The isolator frame 70 is substantially ovate in shape and constructed of plastic or other suitable materials. The posterior end 72 of the isolator frame 70 is closed, and portions thereof function as a tongue depressor. The anterior end 74 terminates in a neck 76 for the attachment of a suction hose (not shown) thereto. The neck 76 is formed at the outer end of a longitudinal passage at one side of the isolator frame 70 which communicates with the interior thereof through an opening 78. The passage is referred to in general by the reference numeral 80.

The upper exterior surface of the isolator frame 70 is provided with a groove 82 shaped to receive the occlusal surface of an upper set of teeth. A second groove 84 is formed in the upper surface of the isolator frame 70 to accommodate the upper lip of a patient.

The lower surface of the isolator frame 70 is upwardly curved and referred to by the reference numeral 86. This lower surface is provided with an elongated opening 88 for the reception of lower teeth.

Referring now to Figure 9 in particular, it will be seen that there is illustrated a modified form of cone which is referred to in general by the reference numeral 90. The cone 90 is configurated to be received over the isolator frame 70 and its lower surface is provided with a pair of apertures 92. The apertures 92 are identical with the aperture 46 of the cone 14 and are intended to selectively receive teeth for the isolation of the same, the apertures 92 being formed in the manner outlined above relative to the apertures 46. It will be understood that the apertures 92 are aligned with the opening when the cone 90 is disposed on the isolator frame 70. The relationship of teeth projecting through the apertures 92 will be identical with that illustrated in Figures 6 and 7 with the exception that the isolator frame 70 is specifically designed for use in operative dentistry on lower posterior teeth.

Referring now to Figures 10 and 11 in particular, it will be seen that there is illustrated a still further modified form of isolator frame which is referred to in general by the reference numeral 94. The isolator frame 94 is similar in configuration to the isolator frame 12, but it is in the form of a body formed of plastic or other suitable materials and it is somewhat similar to the isolator frame 70.

The isolator frame 94 is generally conical and has a generally semi-circular offset anterior portion 96 at the throat 98 thereof. Extending rearwardly from the semi-circular anterior portion 96 is a lower surface 100 which is adapted to engage lower opposing teeth when the isolator frame 98 is disposed in a patient's mouth with the patient's teeth in biting engagement therewith. The upper portion of the semi-circular anterior portion 96 terminates in a rearwardly extending upper portion 102 which includes a centrally located opening 104 therein. The opening 104 is intended to receive upper posterior teeth on the left side of the patient's mouth with the teeth extending into the interior of the isolator frame 94 through the opening 104. The upper portion 102 also includes a downwardly disposed arcuate part 106 which forms the posterior edge of the opening 104. The portion 106 follows the general confines of a roof of the oral cavity and also functions as an upper border for a lower opening 108 in the posterior portion of the isolator frame 94. Disposed inwardly of the opening 108 is an arcuate posterior portion 110 which is adapted to engage a tongue and function as a tongue depressor.

Referring now to Figure 12 in particular, it is seen that there is illustrated a modified form of cone which is referred to in general by the reference numeral 112. The cone 112 is generally conical in outline and is configurated for the reception of the isolator frame 94. The cone 112 includes an access opening 114 which is formed partially by an offset portion 116 which may be considered a cheek portion. The offset portion 116 is adapted to receive an offset portion of the semi-circular anterior portion 96 of the isolator frame 94.

The upper portion of the cone 112 is provided with a pair of perforations 118 which are identical to the apertures 46 and formed in the same manner. The perforations 118 are so arranged whereby they align with the opening 104 of the isolator frame 94 when the two are assembled to form a dental isolator. It will be understood that the complete dental isolator will be disposed within a patient's mouth in biting engagement. The biting engagement of the patient's teeth will result in certain of the teeth engaging the apertures 118 and protruding therethrough. These teeth will then protrude into the interior of the dental isolator, which includes the isolator frame 94 and the cone 112, and the same will be isolated and ready for operative dentistry.

In order that the cone 112 may be retained upon the isolator frame 94, the semi-circular anterior portion 96 is provided with anteriorly projecting teats 120. These teats are intended to engage the cone 112 and retain the same on the isolator frame 94. The isolator frame 94 is also provided with a corrugated anterior edge 122 which closes the open ends of the semi-circular anterior portion 96. The corrugated edge 122 is also intended to engage an edge portion of the cone 112 to retain the same on the isolator frame 94.

Referring now to Figure 13 in particular, it will be seen that there is illustrated an enlarged fragmentary portion of one of the cones after being apertured. Inasmuch as this portion of each of the cones is identical, the cone will be referred to by the reference numeral 14. It will be noted that the cone 14 is intended for the protrusion of three teeth and is provided with that number of apertures which have been referred to by the reference numeral 46. It will also be noted that these apertures are circular and that the same vary in diameter. In this manner, the cone may be utilized in combination with different size teeth.

In view of the foregoing, it is seen that by making the various frames in different sizes and of slightly different configurations while retaining the principles of the same for use in different sized mouths of patients and for the isolation of different teeth of a patient's mouth, any desired tooth may be isolated. It also will be understood that the respective cones for the isolator frame will also be varied in size to correspond to their particular isolator frame. Inasmuch as the cones completely enclose an isolated tooth and open through a patient's mouth, the dental technique is limited to the particularly isolated tooth and a dry field of operation is provided. Also, the provision of the cone eliminates the possibility of any foreign matter, such as abrasive material utilized in the air abrasive technique, from entering the patient's mouth.

While the dental isolators, which are the subject of this invention, are specifically designed for use with the air abrasive technique, it will be understood that it is not intended to so limit the invention. If desired, the dental isolators may be used for all techniques used in operative dentistry.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A dental isolator comprising a supporting frame adapted for placing in a patient's mouth, a flexible cone carried by said frame, an aperture in said cone adapted to receive a tooth in a position projecting into said cone and isolated from the remaining teeth, an entrance in said cone providing access to said isolated tooth.

2. A dental isolator comprising a supporting frame adapted for placing in a patient's mouth, a flexible cone removably carried by said frame, an aperture in said cone adapted to receive a tooth in a position projecting into said cone and isolated from the remaining teeth, an entrance in said cone providing access to said isolated tooth.

3. A dental isolator comprising a supporting frame adapted for placing in a patient's mouth, a flexible cone removably carried by said frame, means on said frame for retaining said cone on said frame, an aperture in said cone adapted to receive a tooth in a position projecting into said cone and isolated from the remaining teeth, an entrance in said cone providing access to said isolated tooth.

4. A dental isolator comprising a supporting frame adapted for placing in a patient's mouth, a flexible cone carried by said frame, an aperture in said cone adapted to receive a tooth in a position projecting into said cone and isolated from the remaining teeth, an entrance in said cone providing access to said isolated tooth, said frame including spaced surfaces for supporting engagement with opposing teeth.

5. A dental isolator comprising a supporting frame adapted for placing in a patient's mouth, a flexible cone carried by said frame, an aperture in said cone adapted to receive a tooth in a position projecting into said cone and isolated from the remaining teeth, an entrance in said cone providing access to said isolated tooth, said aperture normally being of a size smaller than a tooth intended to be received therethrough, said aperture being selectively enlargeable to receive a tooth by stretching said cone in the area of said aperture.

6. A dental isolator comprising a supporting frame adapted for placing in a patient's mouth, a flexible cone carried by said frame, an aperture in said cone adapted to receive a tooth in a position projecting into said cone and isolated from the remaining teeth, an entrance in said cone providing access to said isolated tooth, said frame being discontinued in the immediate area of said aperture, portions of said frame being disposed on opposite sides of said aperture to provide proper support for said cone in the area of said aperture.

7. A dental isolator comprising a supporting frame adapted for placing in a patient's mouth, a flexible cone removably carried by said frame, means on said frame for retaining said cone on said frame, an aperture in said cone adapted to receive a tooth in a position projecting into said cone and isolated from the remaining teeth, an entrance in said cone providing access to said isolated tooth, said frame being discontinued in the immediate area of said aperture, portions of said frame being disposed on opposite sides of said aperture to provide proper support for said aperture to provide proper support for said cone in the area of said aperture.

8. A dental isolator comprising a supporting frame adapted for placing in a patient's mouth, a flexible cone carried by said frame, an aperture in said cone adapted to receive a tooth in a position projecting into said cone and isolated from the remaining teeth, an entrance in said cone providing access to said isolated tooth, said frame being in the form of a hollow body having at least one opening therein for the reception of at least one tooth, said opening in said body being aligned with said aperture in said cone.

9. A dental isolator comprising a supporting frame adapted for placing in a patient's mouth, a flexible cone carried by said frame, an aperture in said cone adapted to receive a tooth in a position projecting into said cone and isolated from the remaining teeth, an entrance in said cone providing access to said isolated tooth, said frame including an offset lip and cheek engaging portion for facilitating lip and cheek retraction, said cone including an offset portion connected to the offset portion of the frame to insure isolation of a tooth from the lips and cheek.

10. A dental isolator comprising a supporting frame adapted for placing in a patient's mouth, a flexible cone carried by said frame, an aperture in said cone adapted to receive a tooth in a position projecting into said cone and isolated from the remaining teeth, an entrance in said cone providing access to said isolated tooth, a rear portion of said frame being in the form of a tongue depressor.

11. A dental isolator frame for effecting the isolation of at least one tooth, said frame being generally conical in outline and including an anterior portion for effecting lip and cheek retraction, upper and lower posteriorly extending portions adapted for disposition between opposing teeth the upper posteriorly extending portion being provided with an opening for at least one tooth.

12. A dental isolator frame for effecting the isolation of at least one tooth, said frame being generally conical in outline and including an anterior portion for effecting lip and cheek retraction, upper and lower posteriorly extending portions adapted for disposition between opposing teeth, the upper posteriorly extending portion being provided with an opening for at least one tooth, said lower posteriorly extending portion terminating in a tongue depressing part.

13. A dental isolator frame for effecting the isolation of at least one tooth, said frame being generally conical in outline and including an anterior portion for effecting lip and cheek retraction, upper and lower posteriorly extending portions adapted for disposition between opposing teeth, the upper posteriorly extending portion being provided with an opening for at least one tooth, said anterior portion being provided with means for retaining a flexible cone on the frame.

14. A dental isolator comprising a supporting frame adapted for placing in a patient's mouth, a flexible cone carried by said frame, an aperture in said cone adapted to receive a tooth in a position projecting into said cone and isolated from the remaining teeth, an entrance in said cone providing access to said isolated tooth, said frame including an exhaust passage.

15. A dental isolator comprising a supporting frame adapted for placing in a patient's mouth, a flexible cone carried by said frame, an aperture in said cone adapted to receive a tooth in a position projecting into said cone and isolated from the remaining teeth, an entrance in said cone providing access to said isolated tooth, said frame including spaced gum engaging bars on opposite sides of said aperture.

16. A dental isolator frame for effecting the isolation of at least one tooth, said frame being generally conical in outline and including an anterior portion for effecting lip and cheek retraction, upper and lower posteriorly extending portions adapted for disposition between opposing teeth, the upper posteriorly extending portion being provided with an opening for at least one tooth, a posterior part of said posteriorly extending portion being in the form of gum engaging bars.

17. A dental isolator frame for effecting the isolation of at least one tooth, said frame being generally conical in outline and including an anterior portion for effecting lip and cheek retraction, upper and lower posteriorly extending portions adapted for disposition between opposing teeth, the upper posteriorly extending portion being provided with an opening for at least one tooth, a posterior part of said posteriorly extending portion being in the form of gum engaging bars, said gum engaging bars being extensible in length.

18. A dental isolator frame for effecting the isolation of at least one tooth, said frame being generally conical in outline and including an anterior portion for effecting lip and cheek retraction, upper and lower posteriorly extending portions adapted for disposition between opposing teeth, the upper posteriorly extending portion being provided with an opening for at least one tooth, said anterior portion being adjustable to vary the spacing of opposed teeth.

19. A dental isolator comprising a supporting frame adapted for placing in a patient's mouth, a flexible cone carried by said frame, an aperture in said cone adapted to receive a tooth in a position projecting into said cone and isolated from the remaining teeth, an entrance in said cone providing access to said isolated tooth, said frame including spaced surfaces for supporting engagement with opposing teeth, said spaced surfaces being arcuate whereby said supporting frame may be rotated to allow complete accessibility to a tooth, teeth in biting engagement with said spaced surfaces being retained in relatively the same open positions during rotation of said supporting frame.

References Cited in the file of this patent

UNITED STATES PATENTS

| Number | Name | Date |
| --- | --- | --- |
| 2,092,549 | Craigo | Sept. 7, 1937 |
| 2,637,107 | Daigle | May 5, 1953 |